United States Patent
De Haan et al.

(10) Patent No.: US 8,073,055 B2
(45) Date of Patent: Dec. 6, 2011

(54) BIASED MOTION VECTOR INTERPOLATION FOR REDUCED VIDEO ARTIFACTS

(75) Inventors: Gerard De Haan, Mierlo (NL); Erwin Bellers, Fremont, CA (US)

(73) Assignee: Trident Microsystems (Far East) Ltd., Grand Cayman (KY)

( * ) Notice: Subject to any disclaimer, the term of this patent is extended or adjusted under 35 U.S.C. 154(b) by 1415 days.

(21) Appl. No.: 10/555,518

(22) PCT Filed: May 3, 2004

(86) PCT No.: PCT/US2004/013732
§ 371 (c)(1),
(2), (4) Date: Nov. 2, 2005

(87) PCT Pub. No.: WO2004/100555
PCT Pub. Date: Nov. 18, 2004

(65) Prior Publication Data
US 2006/0239353 A1 Oct. 26, 2006

Related U.S. Application Data

(60) Provisional application No. 60/467,816, filed on May 2, 2003.

(51) Int. Cl.
*H04N 11/02* (2006.01)
*G06K 9/36* (2006.01)
(52) U.S. Cl. .................. 375/240.16; 382/236
(58) Field of Classification Search .......... 382/232–252; 375/240.16
See application file for complete search history.

(56) References Cited

U.S. PATENT DOCUMENTS

| 5,398,068 A | 3/1995 | Liu et al. |
| 5,812,199 A | 9/1998 | Lu et al. |
| 2002/0186889 A1 * | 12/2002 | De Haan et al. .............. 382/236 |

FOREIGN PATENT DOCUMENTS

| JP | 01-265684 | 10/1989 |
| JP | 03-217185 | 9/1991 |
| JP | 04-234283 | 8/1992 |

OTHER PUBLICATIONS

Office Action corresponding to the related Japanese Patent Application No. 2006-514252 mailed on Mar. 30, 2010. (English and Japanese translations).

Asbun, et al., "Real-Time Error Concealment In Digital Video Streams Using Digital Signal Processors," IEEE Transactions on Consumer Electronics, IEEE Inc New York, US, vol. 47, No. 4, Nov. 2001, pp. 904-909.

Lam, et al., "Recovery of Lost or Erroneously Received Motion Vectors," IEEE, vol. 4, Apr. 27, 1993, pp. 417-420.

* cited by examiner

*Primary Examiner* — Duy M Dang
(74) *Attorney, Agent, or Firm* — DLA Piper LLP (US)

(57) ABSTRACT

In a video processing system where motion vectors are estimated for a subset of the blocks of data forming a video frame, and motion vectors are interpolated for the remainder of the blocks of the frame, a method includes determining, for at least at least one block of the current frame for which a motion vector is not estimated (204), whether a block to the left or right has an estimated zero motion vector (206), determining whether the at least one block had an estimated zero motion vector in a previous frame (206), and if both determinations are affirmative (208), providing a predetermined motion vector for the at least one block. The predetermined motion vector may be a zero motion vector (208).

20 Claims, 2 Drawing Sheets

BIASED MOTION VECTOR INTERPOLATION FOR REDUCED VIDEO ARTIFACTS

PRIORITY CLAIMS/RELATED APPLICATIONS

This application is a 371 U.S. national stage filing of (and claims the benefit and priority to under 35 U.S.C. 119 and 120) PCT/US04/013732 filed on 3 May 2004, which in turn claims the benefit of and priority under 35 U.S.C. 119 to U.S. provisional application Ser. No. 60/467,816 filed 2 May 2003, which is incorporated herein whole by reference.

The present invention relates generally to image processing, and more particularly relates to methods of biased motion vector interpolation to reduce video artifacts.

Advances in semiconductor manufacturing, digital systems architecture, and communication infrastructure have provided the means to produce and deliver large volumes of video content. These advances, in addition to making possible the production and delivery of such video content, have also made it economically feasible for consumer electronic products to incorporate video processing circuitry and software.

Even though the delivery and playback of video content, and in some cases the production of video content, is possible to implement in consumer electronic products, it is desirable to produce such consumer electronic products in a low cost manner. Similarly, even though there have been large increases in the traffic capacity of generally available communication infrastructures, it is nevertheless desirable to reduce the amount of data actually presented for communication. The goal of producing low cost products that operate with video data is generally addressed by attempting to reduce the computational complexity of the tasks required to be performed by such equipment. The goal of reducing communication traffic is generally addressed by compressing the source material such that there is less data to be transmitted.

A variety of well-known schemes, techniques, and standards have been developed for the compression and decompression of video data, as well as other types of image data. A common approach to video compression exploits the fact there is typically a significant amount of commonality between one frame of video and the next temporally sequential video frame. Such approaches may encode a first frame and then process one or more subsequent frames to generate "motion vectors" which are then transmitted in place of those subsequent frames. The motion vectors contain substantially less data than the frames from which they were derived so that less data traffic is generated for transmission. The motion vectors can be used to "reconstruct" the video data for playback.

It will be understood that various video compression schemes may be used even where transmission over a communications network is not intended, such as, for example, when the compressed video is stored on CD, DVD, magnetic disk, video tape, or other such media.

In a process sometimes performed on video data, and referred to as "scan rate conversion", some motion vectors may be interpolated from other motion vectors, rather than being derived from their corresponding actual video data. Such a process provides an estimation of the motion that takes place. This estimation is typically performed by deriving a motion vector for every other block of pixels (where the blocks are typically 8 pixels×8 pixels). Consequently, half of the motion vectors of a total picture are actually interpolated from other motion vectors, rather than being derived from the actual video data. This is done to save on computation, memory, bus bandwidth, and so on. Typically, an averaging, or median filtering, technique is used to generate the missing motion vectors.

Unfortunately, undesirable video artifacts are sometimes generated during playback in systems that use the approach of calculating motion vectors from other motion vectors, rather than deriving all the motion vectors.

What is needed are methods for interpolating motion vectors such that video artifact generation is reduced.

Briefly, in a video processing system where motion vectors are estimated for a subset of the blocks of data forming a video frame, and motion vectors are interpolated for the remainder of the blocks of the frame, a method includes determining, for at least one block of the current frame for which a motion vector is not estimated, whether a block to the left or a block to the right of the at least one block has an estimated zero motion vector, determining whether the at least one block had an estimated zero motion vector in a previous frame, and if both determinations are affirmative, providing a predetermined motion vector for the at least one block. Such a predetermined motion vector may be a zero motion vector.

Generally, the present invention relates to methods for estimating motion vectors in video material. The present invention is an improvement with respect to current interpolation algorithms for interpolating motion vectors of non-estimated regions or blocks. Various embodiments of the present invention provide a method of motion vector interpolation that can be used to improve the results achieved with any arbitrarily chosen interpolation algorithm. In the case where only non-zero motion vectors are obtained in the region of a skipped block, then the skipped block receives, i.e., is assigned, a motion vector which has been interpolated from the motion vectors of the surrounding blocks having the non-zero motion vectors. However, if the motion vector associated with either the block to the left or the block to the right, i.e., the blocks surrounding the skipped block, is zero, and the previous (estimated) motion vector (for the skipped block) is also zero, then a predetermined motion vector, such as a zero motion vector, is used as the current motion vector of the skipped block.

Reference herein to "one embodiment", "an embodiment", or similar formulations, means that a particular feature, structure, operation, or characteristic described in connection with the embodiment, is included in at least one embodiment of the present invention. Thus, the appearances of such phrases or formulations herein are not necessarily all referring to the same embodiment. Furthermore, various particular features, structures, operations, or characteristics may be combined in any suitable manner in one or more embodiments.

Pixel refers to a picture element. A pixel is essentially the smallest addressable unit of a display. One common way of representing pixels is as one or more bits of digital data.

Block refers to a collection of pixels which is a subset of the pixels that make up a frame, or picture.

A neighborhood refers to one or more blocks within a predetermined range of any particular block. In some embodiments the neighborhood includes, but is not limited to, the immediately adjacent blocks for a given block. However, the present invention is not limited to any particular range, or rule set, for defining which blocks are within the neighborhood of a given block.

Skipped block refers to a block for which a motion vector is not estimated. In accordance with the present invention, either a predetermined motion vector (e.g., a zero motion vector), or an interpolated motion vector is assigned to, or produced for, skipped blocks.

An estimated motion vector refers to a motion vector derived, or obtained from, the processing of pixel information.

An interpolated motion vector refers to a motion vector derived, or obtained from, the processing of estimated motion vectors.

Figure 1:
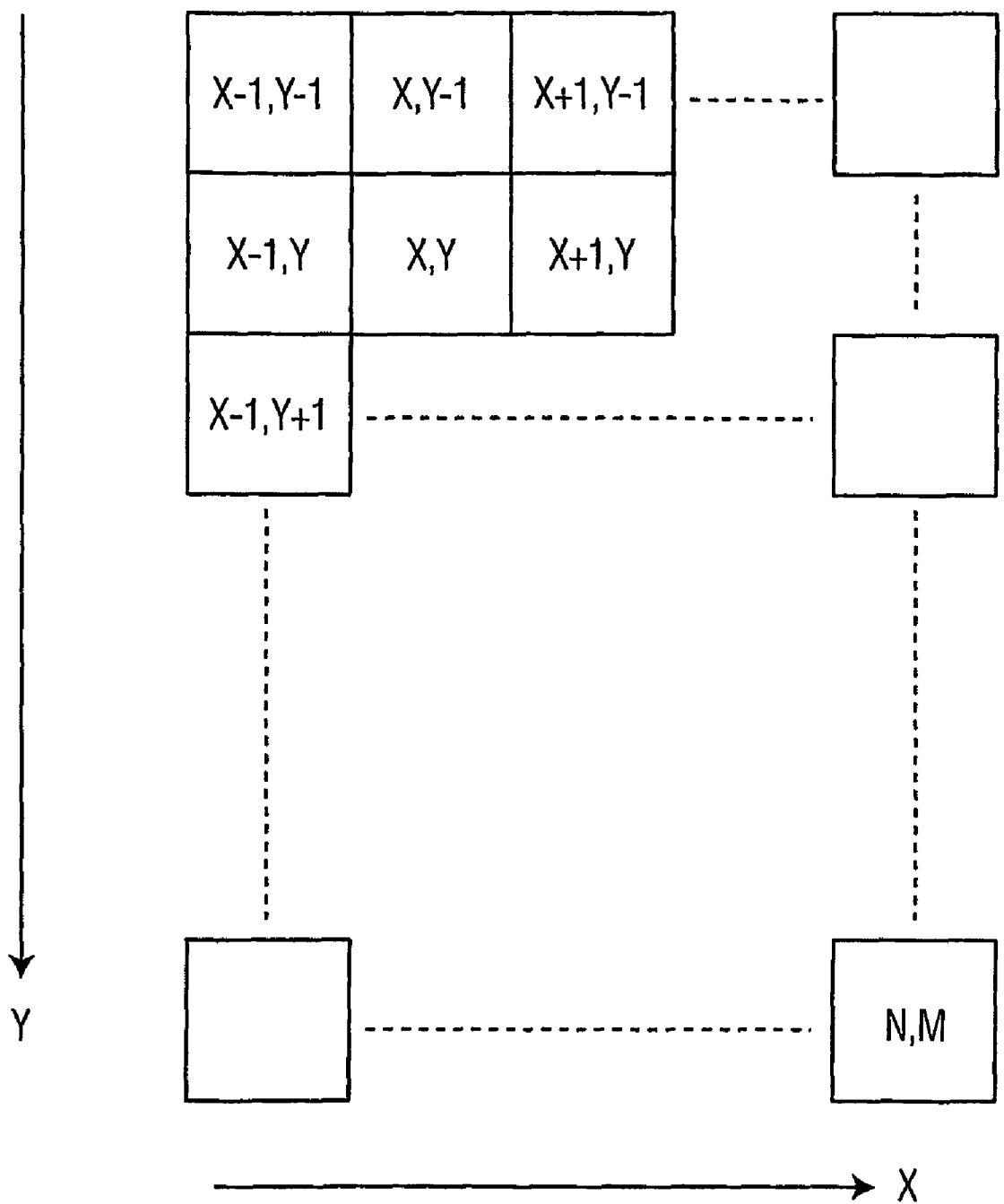
FIG. 1 illustrates a frame of video data partitioned into blocks.

Referring to FIG. 1, an illustrative layout for a partition, or sub-division, of a frame of video data is shown. More particularly, a frame of video data may be represented as a two-dimensional array of pixels. In some embodiments, each pixel is represented by one or more digital bits of data. For many video processing algorithms it is useful to operate on blocks of video data. These blocks of video data are two-dimensional collections of pixels that represent subsets, or sub-arrays, of the frame of video data. These blocks may be of any particular size, although a typical block size is eight pixels by eight pixels. The blocks of video data may be referenced in terms of an X,Y coordinate system. In such a system, each of the blocks may be viewed as being in a row and a column. In this context, a row represents a series of horizontally oriented blocks, each of which would be displayed sequentially across a display screen in a raster type of display. Similarly, a column represents a vertically oriented set of blocks. As illustrated in FIG. 1, an N×M array of blocks is shown which illustrates the partitioning of a two-dimensional frame of video data into a collection of sub-arrays (i.e. blocks). In the illustrative addressing scheme of FIG. 1, arrows indicate the direction of ascending values for the X and Y coordinates. The illustrated frame of video data partitioned into blocks is a convenient device for working with this type of data because it corresponds to the spatial layout of a display generated from the frame of video data. It is noted however, that in any particular implementation of a video processing system in accordance with the present invention, video data may be stored in any convenient or suitable pattern, within a memory or similar storage system, and does not need to be distributed in a such memory system in the same order that the data would be displayed on a visual display.

In motion estimators that are currently being used, in particular for scan-rate conversion, motion vectors are produced (i.e., estimated), for every other block of pixels, where a block is typically 8 pixels by 8 pixels. Consequently, motion vectors based on actual video data are being produced for only half of the picture data. The primary reason for skipping the production of motion vectors based on actual video data for half of the blocks is to reduce the requirements for computational resources. As noted above, determining the motion vector for a block of pixels has a computational cost, and reducing the amount of computation substantially in this way, also reduces the requirement for computational resources in an electronic product, and thereby reduces the cost of that product. However, since motion vectors are required for every block of pixels in any motion-compensation process, the motion vectors for those blocks for which a motion vector computation was not performed need to be produced in a manner which is less computationally intensive than deriving the motion vectors directly from the pixel data.

A common approach to generating the "missing" motion vectors in a manner that has the desired lower computational cost is to use either averaging or median filtering techniques (or a combination of both) to generate the motion vectors for the skipped blocks. Consistency is, therefore, inherently achieved.

As noted above, under certain circumstances, a motion estimator might estimate motion for only part of a picture, that is, only for a subset of the blocks which make up a frame of video data. The motion vectors belonging to the non-estimated regions or blocks are then interpolated from the estimated motion vectors of the blocks in the direct neighborhood. One type of problem may occur, for example, at the left side of sub-titles as the first letter might fall in a block for which a motion vector is not derived based on actual video data and therefore the motion vector for that block needs to be interpolated from its neighborhood. If the vide around the sub-title is moving, it is very likely that with state-of-the-art techniques the block containing the first letter might get a non-zero motion vector, and therefore potentially cause artifacts due to motion compensation techniques.

Various embodiments of the present invention provide desirable results, in terms of improved visual display in video playback, particularly in terms of reduced video artifacts. This is useful for reducing such artifacts which appear in conventional systems, particularly in picture regions containing sub-titles. These various embodiments of the present invention may be used with any number of generic interpolation processes. In this respect, embodiments of the present invention may be readily applied to a wide variety of existing video processing systems and processes.

In an illustrative embodiment, a generic interpolation process is used to produce and assign motion vectors to blocks for which a motion vector was not estimated (i.e., a skipped block) in picture regions that contain only non-zero motion vectors. However, a zero motion vector is assigned to the skipped block if the estimated block on the left or right has a zero motion vector, and the estimated motion vector for the current block in the previous frame was a zero motion vector.

Figure 2:
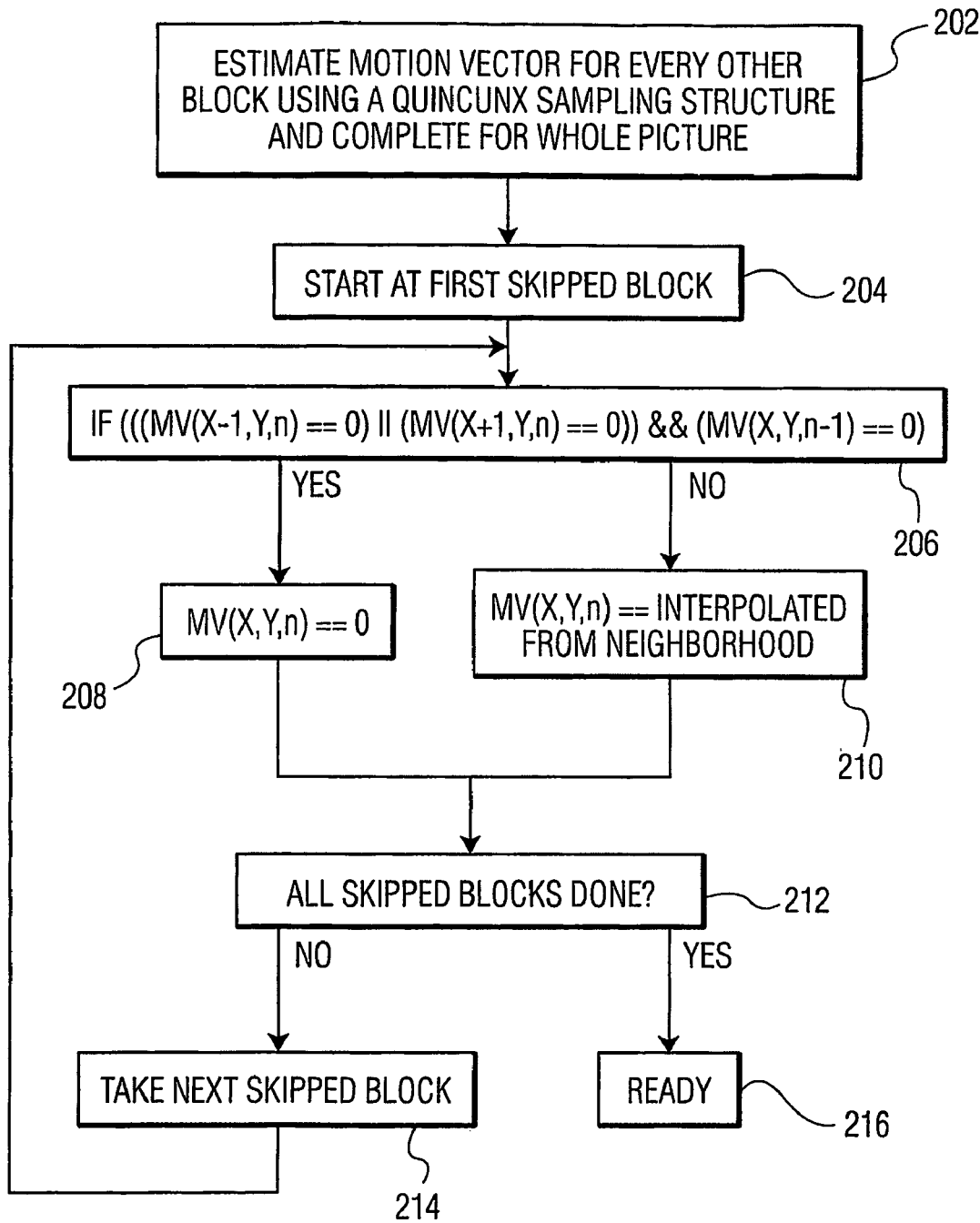
FIG. 2 is a flow diagram illustrating a process of providing motion vectors in accordance with the present invention.

Referring to FIG. 2, an illustrative method in accordance with the present invention is shown. The illustrative method is performed in the context of processing a series of frames of video data, wherein the frames of video data are sub-divided, or partitioned, into blocks, typically of 8 pixels by 8 pixels. In FIG. 2, "MV" indicates motion vector; "X" indicates a block coordinate in the x dimension (typically horizontal); "Y" indicates a block coordinate in the y dimension (typically vertical); and "n" indicates the current frame of video data. With respect to a current frame of video data, motion vectors are estimated 202 for every other block, i.e., for half of the blocks of the current frame of video data. By estimating a motion vector, it is meant that the motion vector is derived from operations performed upon the video data. In the illustrative example of FIG. 2, a quincunx sub-sampling pattern is used. After motion vectors are estimated, a first block of the video data, for which a motion vector was not estimated, is selected 204. Let the coordinates of the first selected block be referred to as (X,Y,n). More generically, the first selected block may be referred to as the current block (X,Y,n). A determination is then made 206 as to whether a motion vector for the block to the left (i.e., MV(X−1,Y,n)), or a motion vector for a block to the right (i.e., MV(X+1,Y,n), of the first selected block (i.e., (X,Y,n)) has a zero motion vector; and whether the motion vector for the first selected block in the previous frame (i.e., MV(X,Y,n−1)) was a zero motion vector. If the determination is affirmative, then a zero motion vector is assigned 208 to the current block (i.e., MV(X,Y,n) is a zero motion vector). If the determination of 206 is negative, then a motion vector is interpolated from the neighborhood of the first selected block and assigned to that block 210. After a motion vector has been assigned to the first selected block (208 or 210), a determination is made 212 as to whether all the blocks which require a motion vector to be assigned have been processed. If the determination of 212 is affirmative then the current frame has been fully processed and the system is ready for the next task 216. If the determination of 212 is negative then another block for which a motion vector was not estimated in the current frame of video data is selected 214, and the process continues at 206.

It is noted that with respect to the relationship between the blocks and the motion vectors, various video compression/decompression systems use the motion vectors to reconstruct a video playback from an initial frame and from the changes indicated by the motion vectors. In other words, rather than transmitting the actual video information in the various blocks of data, motion vectors are transmitted instead. In this regard, it is said that motion vectors are "assigned" to a block, "provided" to a block, or "associated" with a block. It will be understood that these terms are used somewhat interchangeably and are meant to convey the relationship between a motion vector and block which is to be reconstructed by application of the motion vector to an "initial" frame of video data.

In typical embodiments of the present invention, a plurality of frames of video data are received and processed in accordance with method illustrated in FIG. 2.

Various embodiments of the present invention include methods and apparatus for reducing artifacts in processed video data. Such embodiments may be suitable for use in motion estimators and compensators. More particularly, various embodiments of the present invention provide improvement with respect to conventional interpolation processes used for interpolating motion vectors for non-estimated regions, or blocks.

An advantage of some embodiments of the present invention includes a reduction in the video artifacts associated with subtitles in video processing systems that provide estimated motion vectors for only a portion of the blocks of a frame of video data, without processing any additional block, or pixel, data.

It is noted that many alternative embodiments in accordance with the present invention are possible. In one such alternative, the motion vectors associated with blocks that are further separated, spatially and/or temporally, from the current selected block are evaluated in determining whether to assign a zero motion vector to the current selected block. It is noted that such embodiments may require additional computational resources, and in particular that embodiments which utilize blocks further temporally separated from the current block generally require additional memory resources to maintain such a history. Other alternative embodiments may include assigning a motion vector other than the zero motion vector, i.e., a predetermined but non-zero motion vector.

Still other alternative embodiments may include a sampling structure other than a quincunx sub-sampling pattern. In principle, any field alternating sampling pattern may be included in embodiments of the present invention. The quincunx sub-sampling pattern has been presented to illustrate the present invention.

The present invention may be implemented as circuit-based solutions, including possible implementation on a single integrated circuit. As would be apparent to one skilled in the art, various functions of circuit elements may also be implemented as processing operations in a software program. Such software may be employed in, for example, a digital signal processor, micro-controller, or general-purpose computer.

The present invention can be embodied in the form of methods and apparatus for practicing those methods. The present invention can also be embodied in the form of program code embodied in tangible media, such as punched cards, magnetic tape, floppy disks, hard disk drives, CD-ROMs, flash memory cards, or any other machine-readable storage medium, wherein, when the program code is loaded into and executed by a machine, such as a computer, the machine becomes an apparatus for practicing the invention. The present invention can also be embodied in the form of program code, for example, whether stored in a storage medium, loaded into and/or executed by a machine, or transmitted over some transmission medium or carrier, such as over electrical wiring or cabling, through fiber optics, or via electromagnetic radiation, wherein, when the program code is loaded into and executed by a machine, such as a computer, the machine becomes an apparatus for practicing the invention. When implemented on a general-purpose processor, the program code segments combine with the processor to provide a unique device that operates analogously to specific logic circuits.

It is to be understood that the present invention is not limited to the embodiments described above, but encompasses any and all embodiments within the scope of the subjoined claims.

What is claimed is:

1. A method of processing video data, comprising:
providing a frame of video data to at least one of circuitry, a digital signal processor, a micro-controller and a general-purpose computer, the frame of video data comprising a plurality of blocks of pixels, the blocks being addressable in a two-dimensional array of rows and columns;
selecting alternating blocks of the frame of video data and estimating a motion vector for the selected blocks using the at least one of the circuitry, the digital signal processor, the micro-controller and the general-purpose computer;
selecting, using the at least one of the circuitry, the digital signal processor, the micro-controller and the general-purpose computer, at least one block of the frame of video data for which a motion vector has not been estimated, and determining whether a block to the left or a block to the right of the selected at least one block has an estimated zero motion vector, and determining whether the selected at least one block had an estimated zero motion vector in a previous frame; and
providing, if the determinations are affirmative, a predetermined motion vector to the selected at least one block using the at least one of the circuitry, the digital signal processor, the micro-controller and the general-purpose computer.

2. The method of claim 1, wherein the block to the left is the block sequentially preceding the selected at least one block, the block to the right is the block sequentially following the selected at least one block, and the predetermined motion vector is a zero motion vector.

3. The method of claim 1, wherein the previous frame is an immediately preceding frame of video data.

4. The method of claim 1, wherein selecting alternating blocks comprises using a quincunx sub-sampling pattern.

5. The method of claim 1, further comprising, if the determinations are negative, using the at least one of the circuitry, the digital signal processor, the micro-controller and the general-purpose computer for interpolating a motion vector from the motion vectors of the estimated blocks in the neighborhood, and for providing the interpolated motion vector to the selected at least one block, and wherein the predetermined motion vector is a zero motion vector.

6. The method of claim 1, further comprising determining, using the at least one of the circuitry, the digital signal processor, the micro-controller and the general-purpose computer, whether all the blocks of the current frame of video data for which a motion vector has not been estimated have been provided with a motion vector.

7. The method of claim 6, wherein the motion vector provided to the blocks of the current frame of video data for which a motion vector has not been estimated is selected from the group consisting of a zero motion vector and a motion vector interpolated from a neighborhood of the block being provided with the motion vector.

8. The method of claim 7, further comprising storing, using the at least one of the circuitry, the digital signal processor, the micro-controller and the general-purpose computer, the estimated motion vectors of the frame of video data.

9. A method of generating motion vectors for a first plurality of blocks of a frame of data, comprising:
   estimating, using at least one of circuitry, a digital signal processor, a micro-controller and a general-purpose computer, a motion vector for each of a second plurality of blocks, the second plurality being a subset of the first plurality;
   determining, using the at least one of the circuitry, the digital signal processor, the micro-controller and the general-purpose computer, for each of a third plurality of blocks, the third plurality being a subset of the first plurality, and being non-overlapping with the second plurality, whether a block to the left or a block to the right of each of the third plurality of blocks has an estimated zero motion vector, and whether each of the third plurality of blocks was assigned a zero motion vector in a previous frame;
   assigning, using the at least one of the circuitry, the digital signal processor, the micro-controller and the general-purpose computer, to each of the third plurality of blocks for which the determinations are affirmative, a zero motion vector; and
   assigning, using the at least one of the circuitry, the digital signal processor, the micro-controller and the general-purpose computer, to each of the third plurality of blocks for which the determination are negative, a motion vector interpolated from the estimated motion vectors of a neighborhood of blocks surrounding, respectively, each of the third plurality of blocks for which the determination are negative.

10. The method of claim 9, further comprising selecting, using the at least one of the circuitry, the digital signal processor, the micro-controller and the general-purpose computer, the second plurality of blocks as an alternating pattern in a two-dimensional array.

11. The method of claim 9, further comprising selecting, using the at least one of the circuitry, the digital signal processor, the micro-controller and the general-purpose computer, the second plurality of blocks in accordance with a quincunx sub-sampling pattern.

12. The method of claim 9, wherein the second plurality of blocks comprises one half of the first plurality of blocks.

13. The method of claim 12, wherein the frame of data comprises video data.

14. The method of claim 13, further comprising receiving, using the at least one of the circuitry, the digital signal processor, the micro-controller and the general-purpose computer, a plurality of frames of video data.

15. The method of claim 14, further comprising storing, using the at least one of the circuitry, the digital signal processor, the micro-controller and the general-purpose computer, the estimated motion vector for each of the second plurality of blocks.

16. The method of claim 15, wherein the block to the left of each of the third plurality of blocks comprises the block representing the data to be respectively displayed immediately preceding each of the third plurality of blocks.

17. The method of claim 16, wherein the block to the right of each of the third plurality of blocks comprises the block representing the data to be respectively displayed immediately subsequent each of the third plurality of blocks.

18. The method of claim 17, wherein estimating the motion vector comprises processing pixel information within a block.

19. The method of claim 18, further comprising storing, using the at least one of the circuitry, the digital signal processor, the micro-controller and the general-purpose computer, the interpolated motion vectors.

20. A non-transitory computer readable medium upon which machine perceivable instructions are encoded, the instructions such that when perceived and executed by the machine cause the machine to: provide a frame of video data, the frame of video data comprising a plurality of blocks of pixels, the blocks being addressable in a two-dimensional array of rows and columns; select alternating blocks of the frame of video data and estimating a motion vector for the selected blocks; select at least one block of the frame of video data for which a motion vector has not been estimated, and determining whether a block to the left or a block to the right of the selected at least one block has an estimated zero motion vector, and determining whether the selected at least one block had an estimated zero motion vector in a previous frame; and provide, if the determinations are affirmative, a zero motion vector to the selected at least one block.

* * * * *